Nov. 23, 1965   M. E. SPATT   3,218,821
AIR CONDITIONING MEANS FOR VEHICLES
Filed Jan. 18, 1965   5 Sheets-Sheet 1

INVENTOR.
MILTON E. SPATT
BY Felshin and Rosen
ATTORNEYS.

Nov. 23, 1965  M. E. SPATT  3,218,821
AIR CONDITIONING MEANS FOR VEHICLES
Filed Jan. 18, 1965  5 Sheets-Sheet 4

INVENTOR.
MILTON E. SPATT
BY
Felshin and Rosen
ATTORNEYS.

United States Patent Office 3,218,821
Patented Nov. 23, 1965

3,218,821
AIR CONDITIONING MEANS FOR VEHICLES
Milton E. Spatt, 135 Eastern Parkway, Brooklyn, N.Y.
Filed Jan. 18, 1965, Ser. No. 426,253
13 Claims. (Cl. 62—244)

This application is a continuation-in-part of my earlier application Serial No. 302,031, filed August 14, 1963, for air conditioning means for vehicles, now abandoned.

This invention relates to air conditioning means for vehicles, such as buses.

One object of this invention is to provide an air conditioning system of the character described, which system shall be substantially independent of the propulsion system for the vehicle, in which an engine separate from the propulsion system, is coupled to a compressor and mechanically connected to the fans or blowers for the condensers and to a direct current generator separate from the generator of the propulsion system, and in which the separate generator may supply direct current to a direct current motor for blowers or fans for the evaporator.

Another object of this invention is to provide an air conditioning system of the character described in which ready access may be had to said separate engine from one side of the bus, and to the condensers from the other side of the bus, and in which said engine, compressor, and condensers are mounted on a support beneath the floor of the bus, the arrangement being such as to permit easy maintenance and repair of the cooling system.

Still another object of this invention is to provide a highly improved air conditioning system of the character described in which an engine separate from the bus engine is coupled to a compressor and is mechanically connected to blowers for condensers, and also mechanically connected to a generator, separate from the generator of the vehicle electrical system, which supplies current to a motor for driving the evaporator blowers, whereby to provide for increased capacity of air distribution with a smaller motor for the evaporator blowers, and no extra drag on the main engine for the bus, and further permitting use of a smaller, more compact engine for the cooling system.

Yet another object of this invention is to provide an air conditioning system of the character described in which the evaporator, blowers therefor, motor for such blowers, and reheater for air passing to the blowers, are all located at the top rear end of the bus, and in which air is blown by said blowers to a duct lying beneath the top or roof of the bus and extending forwardly longitudinally of the bus body.

Another object of this invention is to provide an electrical system for the air conditioning system which permits operation of the separate generator at a relatively high voltage for air conditioning, and which alternately permits operation of the evaporator blower of the air conditioning system from the battery of the vehicle at a relatively low voltage for ventilating or heating when the air conditioning system is not operating.

Yet another object of this invention is the provision of a direct current evaporator blower motor whose speed, and resultant rate of air flow from the evaporator blower, depends upon the voltage applied thereto.

A further object of this invention is to provide an improved air conditioning system for vehicles, particularly buses, which air conditioning system shall not be dependent upon operating the bus engine, so that the bus can be well cooled before beginning its run or kept cool at any time without operating the main engine of the bus, which system shall be relatively inexpensive to manufacture, economical to operate, with high air flow rate, which shall be capable of considerable lowering of temperature and humidity, which shall utilize a combination of recirculated air and air from outside the bus, and which shall yet be practical and efficient to a high degree in use.

The use of this evaporator blower motor and generator combination of the invention at higher speed for air conditioning and at lower speed for heating or ventilating, permits the same motor to be used for both purposes, thereby eliminating need for two motors of different voltages which would be otherwise required for a system which includes operation of air conditioning not dependent on the bus engine.

Other objects of this invention will in part be obvious and in part hereinafter pointed out.

The invention accordingly consists in the features of construction, combination of elements, and arrangement of parts, which will be exemplified in the construction hereinafter described, and of which the scope of invention will be indicated in the following claims.

In the accompanying drawings in which is shown an illustrative embodiment of this invention:

FIG. 3 is a cross sectional view taken on line 3—3 of FIG. 1;

Figure 1:
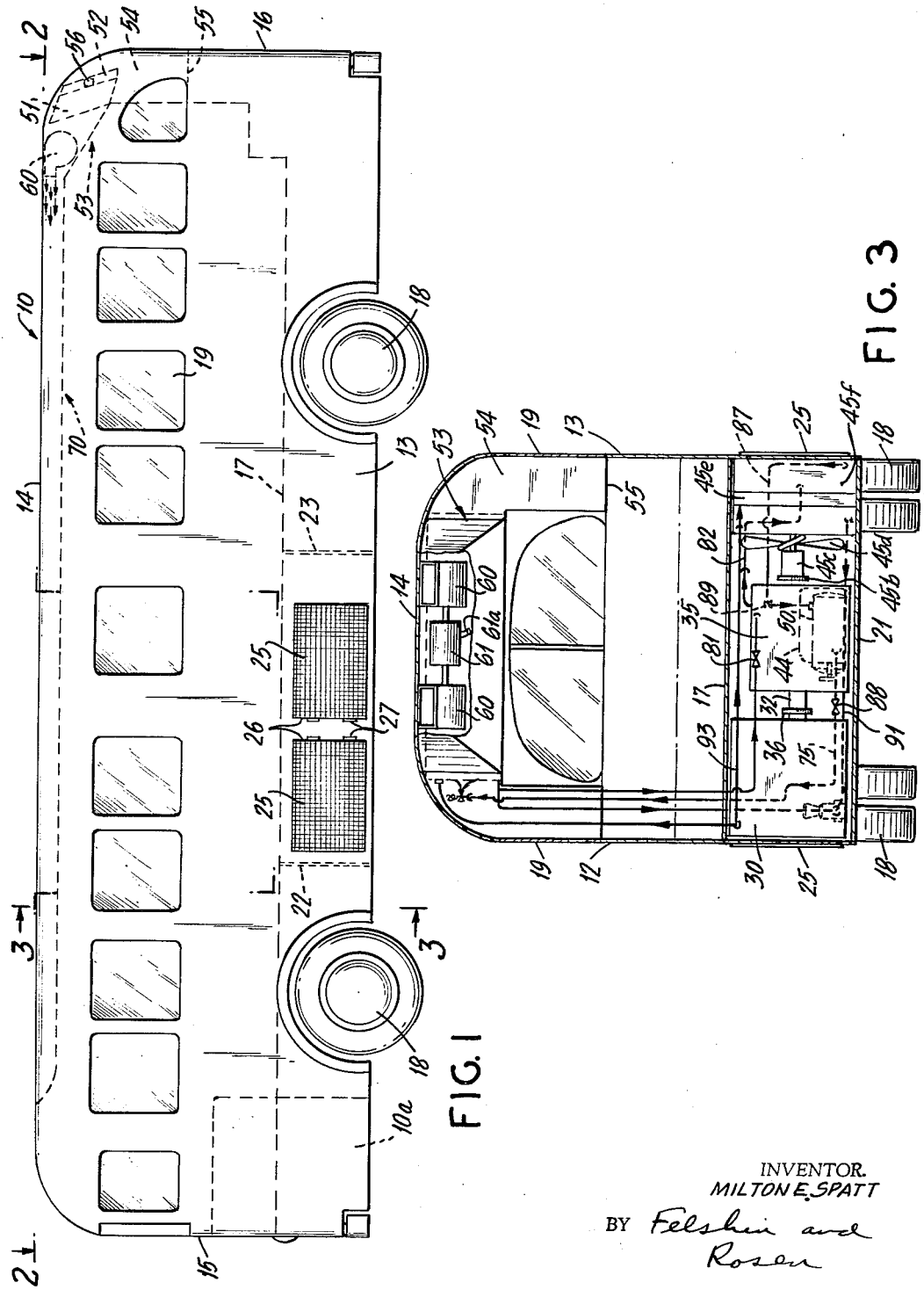
FIG. 1 is a side elevational view of a bus provided with and air conditioning system embodying the invention.
Figure 2:
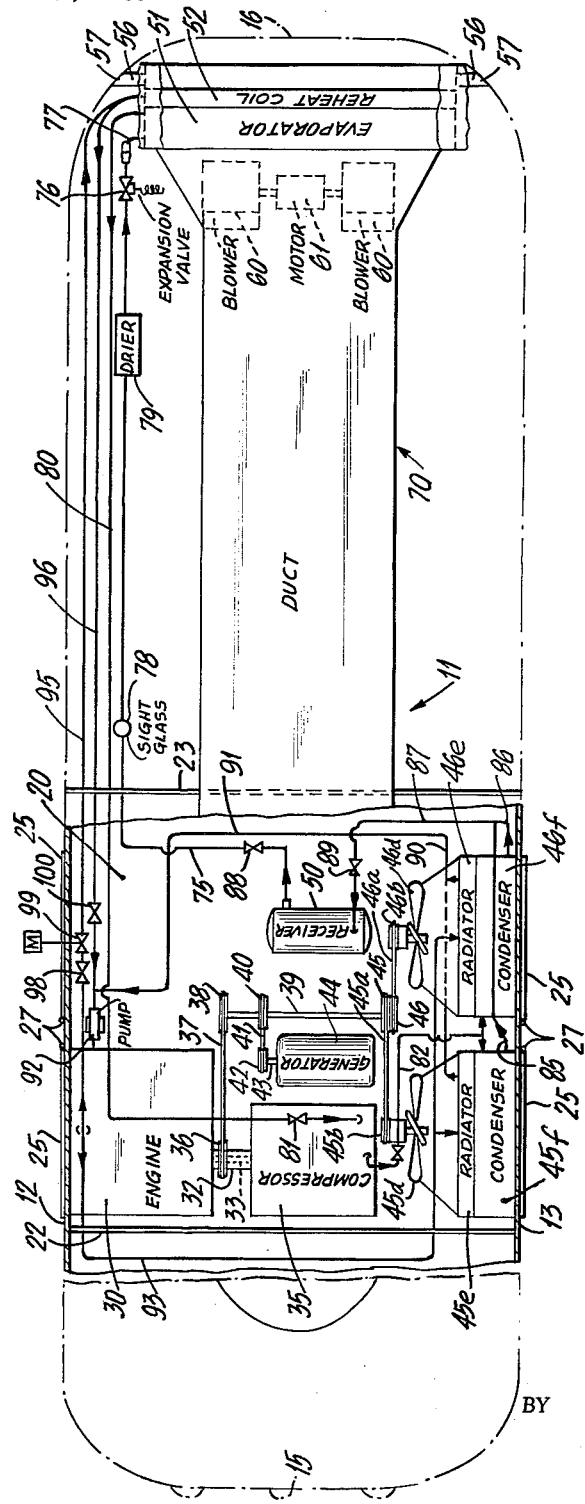
FIG. 2 is a top plan view taken on line 2—2 of FIG. 1.
Figure 3A:
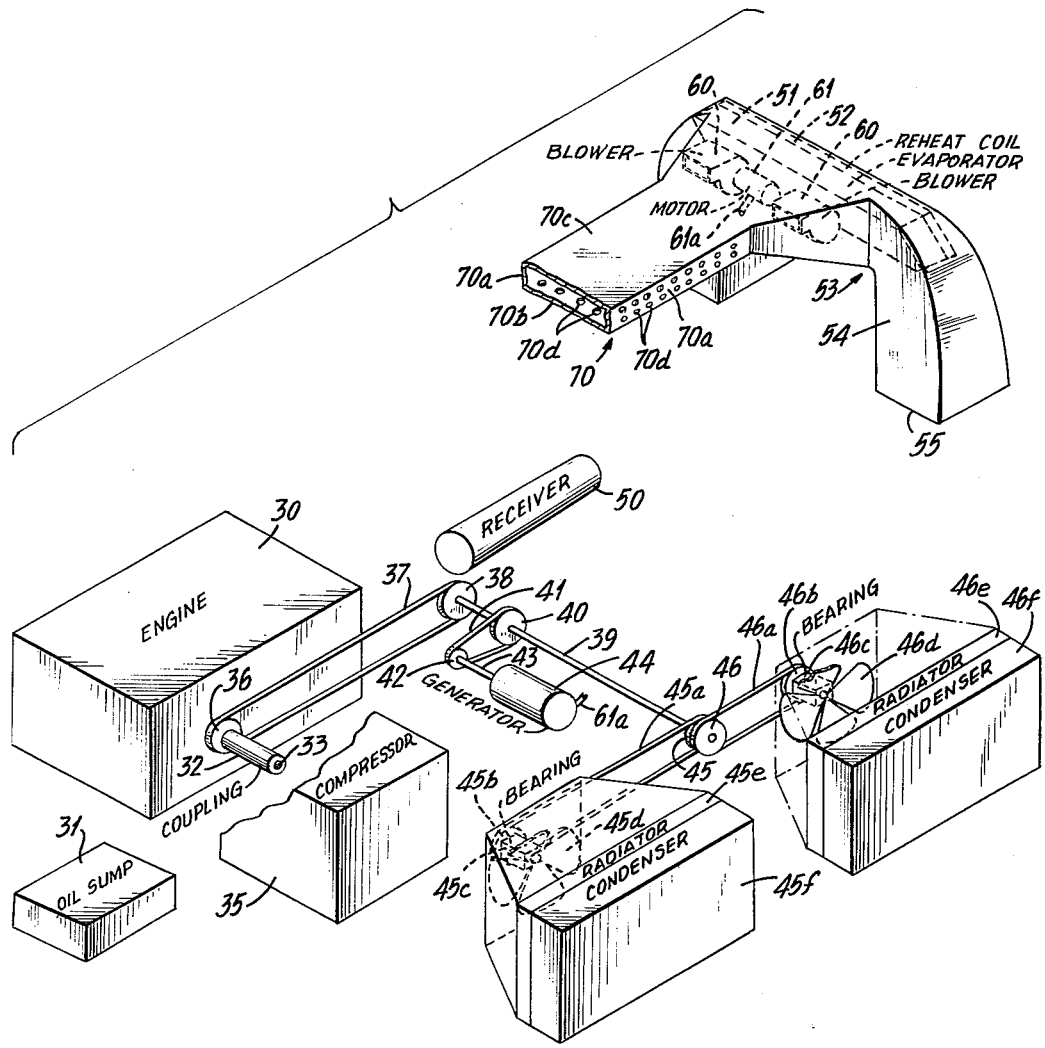
FIG. 3a is an exploded perspective view of part of the refrigerating system shown in FIGS. 1, 2 and 3.

Referring now in detail to the drawing, and particularly to FIGS. 1, 2, 3 and 3a, 10 designates a vehicle such as a bus provided with an air conditioning system 11 embodying the invention.

The bus may be of usual construction having a body formed with side walls 12, 13; a top or roof 14, a front wall 15, a rear wall 16, a floor 17, wheels 18 and windows 19. The bus may have its usual power system or drive including engine and generator at the front of the bus as indicated by numeral 10a. The electrical system of the bus also includes a battery B, shown in FIG. 6.

The propulsion engine 10a for the vehicle can be located at the rear of the vehicle, or at any other suitable location, it being indicated as being located at the front only for the purpose of illustration.

Below the floor 17 and between the wheels 18, is a compartment 20 having a bottom horizontal wall 21, a vertical transverse front end wall 22, and a rear end vertical transverse wall 23. The compartment 20 extends to the side walls 12, 13 of the body of the bus. At said walls are louvered, wire mesh ventilating doors 25 hinged at their inner vertical ends 26, on hinges 27. When the doors are opened, access to the compartment is permitted. The doors 25 allow for ventilation of the compartment.

Within the compartment 20 and mounted on its bottom wall 21 and adjacent wall 12 of the bus and at one end of compartment 20, is an engine 30. This engine, which is preferably a water cooled engine, is separate from the engine that drives the bus. It may be a diesel engine with an oil sump 31, or it may be any other suitable engine. Engine 30 has a transverse output shaft 32 connected by any suitable coupling 33 to a compressor 35 for a refrigerating system. Coupling 33 extends toward the opposite end of the compartment.

On shaft 32 is a pulley 36 connected by a belt 37 to a pulley 38 on a horizontal shaft 39 suitably journalled within the compartment 20, and disposed parallel to said shaft 32. On shaft 39 is a pulley 40 belted by belt 41 to a pulley 42 on a shaft 43 of a generator 44, to generate electric current for the purpose hereinafter appearing. Generator 44 is preferably a 36-volt direct current generator. At one end of shaft 39 are a pair of pulleys 45, 46 belted by belts 45a, 46a, respectively, to pulleys 45b, 46b, having shafts journalled in bearings 45c, 46c and carrying fans 45d, 46d for blowing air on radiators 45e, 46e for the engine 30, and on condensers 45f, 46f. The condensers 45f, 46f are located at the opposite end of the compartment 20, near the doors on wall 13 of the bus body. The bearings 45c, 46c are horizontal and parallel and extend transversely of the bus. A receiver 50 forming part of the refrigerating system, is also located within compartment 20 and suitably supported therein.

Within the bus body, at the rear upper end thereof, is located a transverse evaporator 51 with a reheater coil 52 located forwardly or rearwardly of the evaporator. The evaporator and reheater are located within a casing 53 having downwardly and outwardly curved branches 54 within the bus body. The lower ends of said branches 54 may be closed as at 55. Casing 53 also has side branches 56 extending to screened openings 57 in the side walls of the bus. Thus air from outside the bus may enter the casing 53 to mix with air within the bus to be recirculated. An air intake from the interior of the bus is located between the branches 54 and beneath the evaporator. Within casing 53 are a pair of coaxial blowers 60 rotatable by means of an electric motor 61 which receives its current from the generator 44 by suitable interconnecting wiring 61a. Motor 61 is a direct current motor, and of a type whose speed is proportional to the voltage applied to it for a purpose hereinafter appearing.

Extending from the casing 53 longitudinally and forwardly of the bus body and against the underside of the top wall 14 of the bus, is a duct 70 having side walls 70a, a bottom wall 70b and a top wall 70c. Side walls 70a, and bottom wall 70b are formed with holes 70d, preferably of about one-eighth to one-quarter inch in diameter, to distribute cooled air throughout the length of the bus body. Slots in the duct walls may be used instead of holes.

The outlet end of the receiver 50 is connected by pipe or conduit 75 to an expansion valve 76 said valve being connected by conduit 77 to the inlet of the evaporator 51.

A sight glass 78 and a drier 79 may be interposed in conduit 75, in the well-known manner. The outlet of the evaporator is connected by conduit 80 to the inlet of the compressor 35. A hand valve 81 may be interposed in said conduit 80 and located at the compressor.

The outlet of the compressor is connected by conduit 82 to the inlets of the condensers 45f, 46f. The outlets of said condensers are connected by conduits 85, 86 to a conduit 87 which connects to the inlet of the receiver 50. Hand valves 88, 89 are interposed in conduits 75, 87 respectively, at opposite sides of the receiver.

The outlets of the radiators 45e, 46e are connected by a conduit 90 which is connected by conduit 91 to the inlet end of a pump 92. The outlet of pump 92 is connected to the inlet of the water jacket of the water cooled engine 30. The outlet of the water jacket is connected by conduit 93, to the inlet of the radiators 45e, 46e. A conduit 95 connects the outlet of the water jacket of the engine 30 to the inlet end of the reheater 52. The outlet end of the reheater is connected by conduit 96 to the inlet end of the pump 92.

Valves 98, 99 may be interposed in conduit 95. A valve 100 may be interposed in conduit 96. Thus, hot water is circulated to the reheater 52.

Pump 92 pumps water back to the water jacket of the engine 30. From there it is pumped through conduit 93 to the two radiators 45e, 46e. From the radiators, water passes through conduit 90, 91 back to the pump. Water also passes from the engine through conduit 95 to the reheat coil and from the reheat coil, by way of conduit 96, back to the pump 92.

It will now be understood that liquid refrigerant in the receiver 50 passes to the evaporator 51. The expansion valve 76 causes gasification of the liquid refrigerant in the evaporator, in the well-known manner. The gasified refrigerant passes to the compressor and from there to the air cooled condenser and back to the receiver. The refrigeration process is well known. The evaporator cools air which is blown to the duct and is distributed throughout the length of the bus. Air is recirculated and some air from the outside is drawn in at opening 57. There is no drag on the bus engine, and only a negligible drain on its generator or on its battery.

The purpose of the reheater is to increase the temperature of air which is cooled by the evaporator to a low temperature which would be too cold for the comfort of the passengers. The reason that the evaporator cools the air too low for comfort is to dehumidify. The temperature in the evaporator is as low as is necessary to condense moisture which is removed by running off. The water condenses on the evaporator coil and drains away. The cool air, cooled by the evaporator must be reheated to a comfortable temperature for air supplied to the bus.

Figure 4:
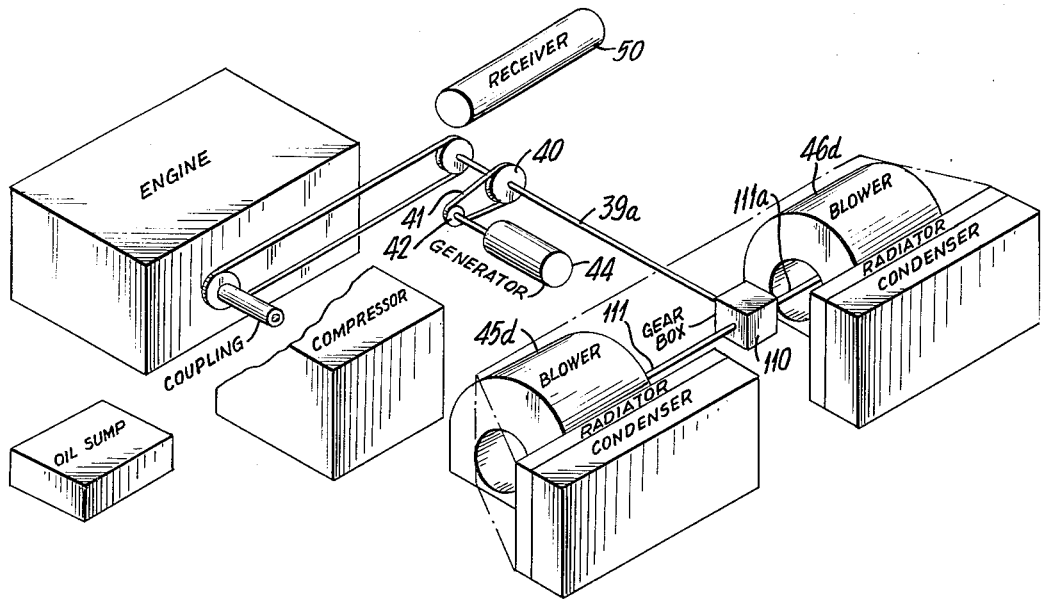
FIG. 4 is an exploded perspective view illustrating a modified air cooling system embodying the invention.

In FIG. 4 there is shown a modified construction similar to that shown in FIGS. 1, 2, 3 and 3a expect that the belt drives are replaced by a gear box 110 on shaft 39a (which replaces shaft 39a). Gear box 110 is connected by either flexible or rigid shafts 111, 111a to the blowers or fans 45d, 46d.

Figure 5:
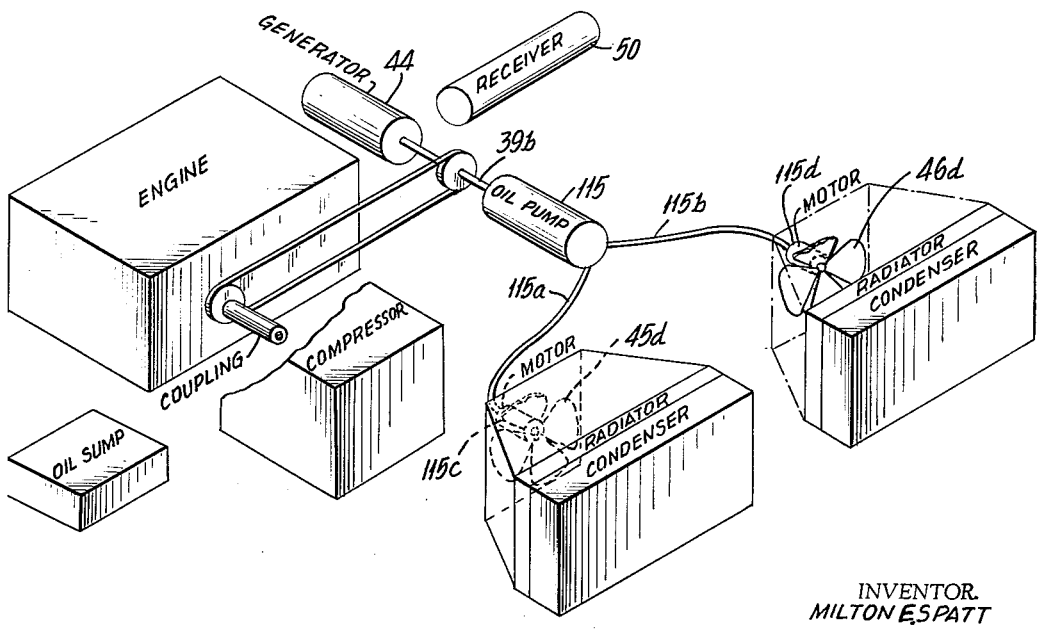
FIG. 5 is a view similar to FIG. 4 and illustrating a further modified form of the invention.

In FIG. 5 there is shown another modification likewise similar to the construction of FIGS. 1, 2, 3, 3a, except that shaft 39b (which replaces shaft 39) operates both the generator 44 directly and also an oil pump 115 connected by conduits 115a, 115b to oil motors 115c, 115d which operate fans or blowers 45b, 46d respectively.

Figure 6:
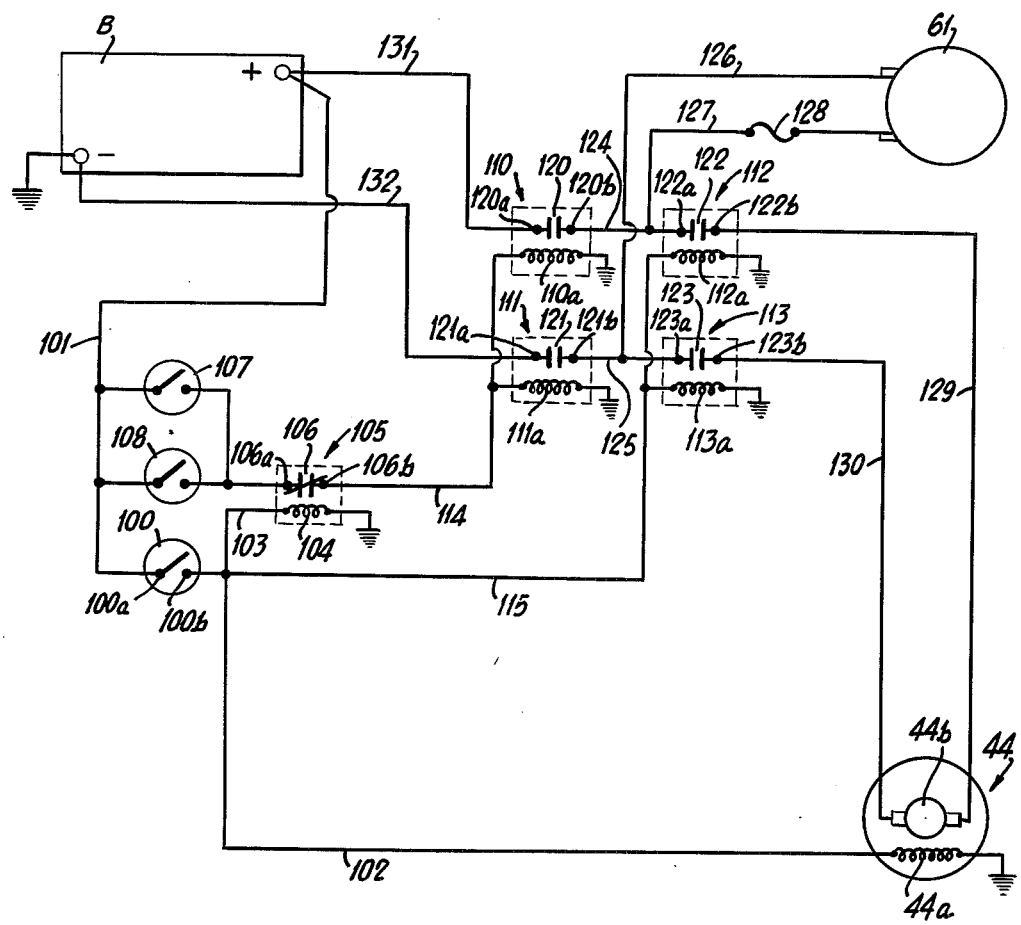
FIG. 6 is a schematic showing of the electrical system.

In FIG. 6, there is shown a schematic drawing of the electrical system of the present invention. The system includes a main switch 100 to turn on the air conditioner. Switch 100 is manually operated and has one pole 100a connected by a conductor 101 to the positive pole + of the battery B of the vehicle. The other pole 100b of switch 100 is connected by a conductor 102 to the field 44a of the separate generator 44. The armature 44b of generator 44 is mechanically connected to engine 30 in any of the ways shown in FIGS. 3a, 4 or 5. A conductor 103 connects pole 100b of switch 100 to the coil 104 of a lock-out or safety relay 105. The other pole of coil 104 is suitably grounded. Relay 105 includes a normally closed pair of contacts 106 having two poles 106a and 106b. The system also includes two other switches 107 and 108, which are connected in parallel between conductor 101 and pole 106a of contacts 106 of relay 105. The purpose of these switches 107, 108 will be explained hereinafter.

The electrical system includes four relays 110, 111, 112 and 113, each of which has a coil 110a, 111a, 112a and 113a, one pole of each of which is suitably grounded. The other poles of coils 110a and 111a are connected in parallel by a conductor 114 to pole 106b of contacts 106 of relay 105. The other poles of coils 112a and 113a are connected in parallel by a conductor 115 to pole 100b of switch 100. Each relay 110, 111, 112 and 113 has a pair of normally open contacts 120, 121, 122 and 123 respectively, each of which has poles 120a and 120b, 121a and 121b, 122a and 122b, and 123a and 123b. A conductor 124 connects poles 120b and 122a. A conductor 125 connects poles 121b and 123a. One pole of the evaporator blower motor 61 is connected by a conductor 126 to conductor 125, and the other pole of evaporator blower motor 61 is connected by a conductor 127 to conductor 124. Conductor 127 may have a suitable fuse 128 therein to protect the motor as is well known. One pole of the generator 44 is connected by a conductor 129 to pole 122b, and the other pole thereof is connected by a conductor 130 to pole 123b. Pole 120a is connected by a conductor 131 to the positive pole + of the vehicle battery B, and pole 121a is connected by a conductor 132 to the negative − thereof.

If either switch 107 or 108 is closed while switch 100 is open, motor 61 will be operated directly from the battery B, and will operate at a slow speed since the battery is usually 12 volts. Either switch 107 or 108 will activate coils 110a and 111a, closing normally open contacts 120 and 121, and completing the circuit from battery B to motor 61 through conductors 131, 124, 127, 126, 125, and 132. This slower speed is suitable for ventilating or heating the bus. Therefore, switch 107 may be a manually operated ventilating switch, and switch 108 may be a manually operated heating switch controlling a thermostat which is part of a heating system (not shown) of the bus and which may operate valves between the reheat coil 52 and the water jacket of the separate engine 30, and/or the main engine of the bus, to either shut off or turn on the heat in the bus. The additional means and components operating in conjunction with switch 108 are not shown as they are well known in the art.

When it is desired to air condition the bus, the main switch 100 is closed. Through well known means, not shown, this also starts the separate engine 30. Through conductor 102, the field 44a of generator 44 is activated and, as the armature 44b is turned by the engine 30, the generator produces electricity, as well known. Through conductor 103, the coil 104 of relay 105 is activated, thereby opening the normally closed contacts 106. Thus a brake in conductor 114 is established and the switches 107 and 108 are rendered inoperative to actuate coils 110a and 111a, making operation of the motor 61 directly from battery B impossible when switch 100 is closed. Through conductor 115 switch 100 is operative to actuate coils 112a and 113a to close normally open contacts 122, 123 to thereby complete the circuit from the generator 44 to motor 61 through conductors 129, 124, 127, 126, 125 and 130. Since the generator 44 produces a higher voltage, preferably 36 volts, the blowers will run at higher speed and produce a greater air flow which is desirable for air conditioning purposes. Relay 105 is a safety in that it prevents the possibility of the heater 61 being driven from both the battery B and the generator 44, which condition could possibly damage the electrical system.

The reheat coil or reheater 52 may be located in front of the evaporator instead of at the rear thereof and may be part of the bus heating system if there is a heating system for the bus.

An air cooled engine may be used instead of the water cooled engine 30. In such event, the reheater coil can receive hot water from the water jacket or radiator of the propulsion engine 10a of the vehicle.

The top paneling or any part of the top of the bus may close the top of the duct 70, thus making top wall 70c unnecessary.

The evaporator, reheat coil and blowers or fans for the evaporator may be located at one side wall of the bus, at the middle thereof, with the ducts extending forwardly and rearwardly. In buses which are equipped with existing ducts, the evaporator and its fans or blowers and reheat coils could be fitted to such ducts. Hence they could be located beneath the floor or elsewhere in relation to the bus.

Although a compartment 20 has been illustrated with hinged louvered or grilled doors at the ends, it will be understood that the separate engine, compressor, generator and condensers may all be located on any suitable frame, support or platform beneath the floor of the bus. Instead of using ventilated hinged doors, the doors may be solid or may be eliminated; or fixed or removable grilled or solid panels may be used. Also, the condensers with their fans or blowers may be, if desired, located elsewhere than in the compartment or beneath the floor; or only one condenser may be placed in the compartment and one elsewhere on the bus.

An important feature of this invention is the fact that the generator 44 is separate from the generator of the propulsion engine. With such construction, evaporator blowers and motor therefor of greater capacity may be used, thereby giving greater efficiency of air conditioning. By use of a separate generator, enough voltage is provided to allow for much greater evaporator blower motor speed and hence, much greater distribution of air.

When current for the evaporator blower motor is taken from the generator of the propulsion engine or from the battery associated therewith (usually 12 volts) a very large motor would be necessary to obtain the required horsepower. Such a motor would be difficult to fit into the bus, and furthermore it would pull too much current. Hence in prior air conditioning systems for vehicles using current from a generator or battery associated with the propulsion motor of the vehicle, smaller motors were used, which would fit into the bus and which would drain less current from the electrical system of the bus. However with such constructions, it was not possible to handle enough air to efficiently air condition the bus. With the use of a separate generator, a higher voltage can be employed and for the requisite greater capacity of air distribution, smaller motors can be employed which will fit readily into the bus and drag on the electrical system of the propulsion means for the bus, is substantially eliminated.

It shall be understood that the term blowers or fans as used herein shall be taken to mean any air movers, such as centrifugal blowers, propeller type fans or another means to cause a flow or current of air.

It will be noted that there is but a slight drain on the electric system receiving its current from a generator powered by the propulsion motor of the bus or vehicle; current may be drawn therefrom for starting the engine 30 and for actuating the coils of the relays 105, 110, 111, 112 and 113, and the field 44a of the generator 44.

Usual automatic controls may be provided for the air cooling system. An air filter may be provided for all air going over the evaporator.

While a radiator is shown with each condenser, only a single radiator may be employed even when using more than one condenser.

The separate direct current generator 44 in the present invention provides current only for the evaporator blower direct current motor. This generator has a greater voltage than the voltage of the direct current battery or generator or alternator associated with the power drive for the vehicle. The generator 44 of larger voltage can operate a larger horsepower motor for the evaporator blower, which motor can hence be smaller in dimension than a smaller voltage motor which would operate from the battery or generator (or electric system) of the power drive (which is of less voltage) to be capable of supplying the same amount of air as the higher voltage motor. The smaller motor takes less room.

The separate generator permits the air conditioning system to be run without running the power drive—or main vehicle engine.

The evaporator blower motor of higher horsepower (and hence smaller dimension for better fit) is powerful enough to use for operation of the air conditioning system, yet it may be operated by the battery, generator or other electric system of the power drive, at less voltage and hence at less capacity for purpose of ventilation or heating (without running the air conditioning system), as explained above.

For heating and ventilation alone, much less air circulation is needed, and in such circumstance, the direct current evaporator blower motor of higher voltage capacity may be operated on lesser voltage, drawing less amperes from the electric system of the main power drive, and hence will not run down the bus battery and/or overload the generator of the main bus engine, and at the lesser voltage will circulate just the amount of air necessary for heating and ventilating.

It will thus be seen that there is provided an apparatus in which the several objects of this invention are achieved, and which is well adapted to meet the conditions of practical use.

As possible embodiments might be made of the above invention, and as various changes might be made in the embodiments above set forth, it is to be understood that all matter herein set forth or shown in the accompanying drawings is to be interpreted as illustrative and not in a limiting sense.

I claim:

1. In combination, a passenger vehicle having a body provided with a roof and a power drive therefor, including an engine and an electrical system comprising a battery, an air conditioning system for the body of said vehicle, comprising a separate engine, a compressor, mechanical drive means connecting the separate engine to the compressor for driving the latter, a condenser, a blower for said condenser, a separate direct current generator of higher voltage than the voltage of said battery, mechanical drive means connecting said separate engine to said generator and to said condenser blower, an evaporator, an evaporator blower for said evaporator, a direct current electric motor for said evaporator blower, the speed of said motor increasing upon increase of applied voltage and decreasing upon decrease of applied voltage, a circuit having means to selectively supply direct current from said separate generator and from said battery to said evaporator blower motor, a receiver for refrigerant, conduit means connecting the outlet of the receiver to the inlet of the evaporator, an expansion valve in said conduit means, conduit means connecting the outlet of the evaporator to the inlet of said compressor, conduit means connecting the outlet of the compressor to the inlet of said condenser, and conduit means connecting the outlet of the condenser to the inlet of the receiver, said evaporator blower motor operated by current from said battery at reduced voltage and at lower velocity than when it is operated by current from said separate generator, whereby to supply a lesser flow of air from said evaporator blower for heating or ventilating when operated from said battery.

2. The combination of claim 1, said selective means including a first switch in said circuit and means controlled by said first switch to cause flow of current from said generator to said evaporator blower motor, a second switch in said circuit and means controlled by said second switch to cause flow of current from said battery to said evaporator blower motor.

3. The combination of claim 2, and said circuit further comprising means controlled by actuation of said first switch to prevent flow of current to the evaporator blower motor from said battery upon actuation of said second switch.

4. The combination of claim 1, said vehicle body having opposite side walls, a floor, a roof and front and rear ends, a support carried by said body beneath said floor, said separate engine, compressor and condenser being mounted on said support, with the separate engine adjacent one side wall of the body and the condenser adjacent the other side wall of said body, said mechanical drive means connecting said separate engine to said compressor comprising coaxial coupled shafts on said separate engine and compressor, said separate compressor being mounted on said support, and having a shaft parallel to said coupled shafts, said mechanical drive means connecting said separate engine to said generator and to said condenser blower, comprising drive means connecting said coupled shaft to said generator shaft and to said condenser blower, said compressor being located between said separate engine and said condenser, and the drive means connecting the separate engine to said generator and to said condenser blower being mounted on said support.

5. The combination of claim 1, said evaporator being located within and at the rear end of the body and adjacent the roof, a casing for said evaporator having an air inlet within said body to receive air to be recirculated, said evaporator blower and evaporator blower motor being located within said casing, and a duct extending forwardly from said casing longitudinally of the body and at the underside of the body roof, and being formed with spaced outlet openings to distribute cooled air to the inside of the body.

6. An air conditioning system for a vehicle, said vehicle having an electrical system comprising a battery, said air conditioning system comprising an engine having a shaft, a compressor having a shaft, a coupling connecting said engine shaft to said compressor shaft in coaxial relation, a third shaft, drive means connecting said coupled shafts to said third shaft, a direct current generator of a voltage greater than the voltage of said battery, said generator having a shaft, drive means connecting said third shaft to the generator shaft for operating said generator, a condenser, a blower for said condenser, drive means connecting said third shaft with said condenser blower, an evaporator, a blower for said evaporator, a direct current motor for said evaporator blower, a circuit having means to selectively supply direct current from said generator and from said battery to said motor, a receiver, means connecting the outlet of said receiver with the inlet of said evaporator, an expansion valve controlling said last means, means connecting the outlet of said evaporator with the inlet of the compressor, means connecting the outlet of the compressor to the inlet of the condenser, means connecting the outlet of the condenser with the inlet of the receiver, and said third shaft, coupled shafts and generator shaft being parallel.

7. In combination, a vehicle provided with a floor and a roof and an electrical system comprising a battery, a compartment beneath the floor extending transversely of the body from side to side, the opposite ends of the compartment opening to the opposite sides of the body, a cooling system for said body, comprising an engine in the compartment and adjacent one open end thereof, and having a shaft projecting toward the opposite end, a compressor within the compartment and having a shaft coaxially connected to the first shaft by means of a coupling, a condenser in the compartment, adjacent said opposite end thereof, a blower for said condenser between said condenser and compressor, a direct current generator of higher voltage than said battery in said compartment, means to drivingly connect said coupled shafts to said generator, means to drivingly connect said coupled shafts to said condenser blower, and an evaporator within said vehicle body, a blower for said evaporator, a direct current motor for said blower, a circuit having means to selectively supply direct current from said generator and from said battery to said motor, said evaporator, said evaporator blower and said evaporator blower motor being located within the vehicle body and at the rear of the body and just beneath said roof of the body, a casing housing said evaporator and its blower and blower motor, and a duct extending from said casing forwardly of the body and adjacent the roof and being formed with air distributor openings.

8. The combination of claim 4, said evaporator being located within and at the rear of the body and adjacent the roof, a casing for said evaporator having an air inlet within said body to receive air to be recirculated, said evaporator blower and evaporator blower motor being located within the casing, and a duct extending forwardly from said casing longitudinally of the body and at the underside of the body roof, and being formed with longitudinally spaced outlet openings to distribute cooled air to the inside of the body.

9. In combination, a passenger vehicle having a body provided with a roof and a power drive therefor, including an engine and an electrical system, comprising a battery, an air conditioning system for the body of said vehicle, comprising a separate engine, a compressor, mechanical drive means connecting the separate engine to the compressor for driving the latter, a condenser, a blower for said condenser, a separate generator, mechanical drive means connecting said separate engine to said generator and to said condenser blower, an evaporator, an evaporator blower for said evaporator, a direct current electric motor for said evaporator blower, the speed of said motor increasing upon increase of applied voltage and decreasing upon decrease of applied voltage, a circuit having means to selectively supply direct current from said separate generator at a relatively higher voltage and from said battery at a relatively lower voltage to said evaporator blower motor, a receiver for refrigerant, conduit means connecting the outlet of the receiver to the inlet of the evaporator, an expansion valve in said conduit means, conduit means connecting the outlet of the evaporator to the inlet of said compressor, conduit means connecting the outlet of the compressor to the inlet of said condenser, and conduit means connecting the outlet of the condenser to the inlet of the receiver, said evaporator blower motor operated by current from said battery at reduced voltage and at lower velocity, than when it is operated by current from said separate generator, whereby to supply a lesser flow of air from said evaporator blower for heating or ventilating when operated from said battery.

10. An air conditioning system for a vehicle, said vehicle having an electrical system comprising a battery, said air conditioning system comprising an engine having a shaft, a compressor having a shaft, a coupling connecting said engine shaft to said compressor shaft in coaxial relation, a third shaft, drive means connecting said coupled shafts to said third shaft, a generator, said generator having a shaft, drive means connecting said third shaft to the generator shaft for operating said generator, a condenser, a blower for said condenser, drive means connecting said third shaft with said condenser blower, an evaporator, a blower for said evaporator, a direct current motor for said evaporator blower, a circuit having means to selectively supply direct current at a relatively higher voltage from said generator and at a relatively lower voltage from said battery to said motor, a receiver, means connecting the outlet of said receiver with the inlet of said evaporator, an expansion valve controlling said last means, means connecting the outlet of said evaporator with the inlet of the compressor, means connecting the outlet of the compressor to the inlet of the condenser, means connecting the outlet of the condenser with the inlet of the receiver, and said third shaft, coupled shafts and generator shaft being parallel.

11. In combination, a vehicle provided with a floor and a roof and an electrical system comprising a battery, a compartment beneath the floor extending transversely of the body from side to side, the opposite ends of the compartment opening to the opposite sides of the body, a cooling system for said body, comprising an engine in the compartment and adjacent one open end thereof, and having a shaft projecting toward the opposite end, a compressor within the compartment and having a shaft coaxially connected to the first shaft by means of a coupling, a condenser in the compartment, adjacent said opposite end thereof, a blower for said condenser between said condenser and compressor, a generator in said compartment, means to drivingly connect said coupled shafts to said generator, means to drivingly connect said coupled shafts to said condenser blower, and an evaporator within said vehicle body, a blower for said evaporator, a direct current motor for said blower, a circuit having means to selectively supply direct current from said generator at a relatively higher voltage and from said battery at a relatively lower voltage to said motor, said evaporator, said evaporator blower and said evaporator blower motor being located within the vehicle body and at the rear of the body and just beneath said roof of the body, a casing housing said evaporator and its blower and blower motor, and a duct extending from said casing forwardly of the body and adjacent the roof and being formed with air distributor openings.

12. The combination of claim 9, said selective means including a first switch in said circuit and means controlled by said first switch to cause flow of current from said generator to said evaporator blower motor, a second switch in said circuit, and means controlled by said second switch to cause flow of current from said battery to said evaporator blower motor .

13. The combination of claim 12, and said circuit further comprising means controlled by actuation of said first switch to prevent flow of current to the evaporator blower motor from said battery upon actuation of said second switch.

References Cited by the Examiner
UNITED STATES PATENTS

| | | | |
|---|---|---|---|
| 2,660,865 | 12/1953 | Durant | 62—239 |
| 2,784,568 | 3/1957 | Schjolin | 62—239 X |
| 2,926,504 | 3/1960 | Hellinger | 62—457 X |
| 3,008,694 | 11/1961 | Todd | 62—117 X |
| 3,156,101 | 11/1964 | McGuffey | 62—430 X |

ROBERT A. O'LEARY, *Primary Examiner.*

LLOYD L. KING, *Examiner.*